US012536646B2

(12) United States Patent
Horita (10) Patent No.: US 12,536,646 B2
(45) Date of Patent: Jan. 27, 2026

(54) STRUCTURE DAMAGE CAUSE ESTIMATION SYSTEM, STRUCTURE DAMAGE CAUSE ESTIMATION METHOD, AND STRUCTURE DAMAGE CAUSE ESTIMATION SERVER (71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 368 days.

(21) Appl. No.: 17/319,187

(22) Filed: May 13, 2021

(65) Prior Publication Data

US 2021/0272262 A1 Sep. 2, 2021

Related U.S. Application Data (63) Continuation of application No. PCT/JP2019/044449, filed on Nov. 13, 2019.

(30) Foreign Application Priority Data

Nov. 29, 2018 (JP) .................................. 2018-223786

(51) Int. Cl.
*G06K 9/00* (2022.01)
*G06F 16/53* (2019.01)
(Continued)

(52) U.S. Cl.
CPC .............. *G06T 7/001* (2013.01); *G06F 16/53* (2019.01); *G06F 16/5866* (2019.01);
(Continued)

(58) Field of Classification Search
CPC ......... G06T 7/001; G06T 7/74; G06T 3/4038; G06T 7/0002; G06T 7/60;
(Continued)

(56) References Cited

U.S. PATENT DOCUMENTS 6,246,788 B1 * 6/2001 Pattikonda ............ G06T 7/0006
257/E21.53
6,725,097 B1 * 4/2004 Basile ...................... G07C 3/10
700/1
(Continued)

FOREIGN PATENT DOCUMENTS

CN 108027301 A 5/2018
CN 108027948 A 5/2018
(Continued)

OTHER PUBLICATIONS

Zhang Hui et al.; "Automatic Crack Inspection for Concrete Bridge Bottom Surfaces Based on Machine Vision"; 2017 Chinese Automation Congress (CAC); Oct. 20, 2017; pp. 4938-4943; IEEE. XP033290242. [retrieved on Dec. 29, 2017].
(Continued)

*Primary Examiner* — Avinash Yentrapati
(74) *Attorney, Agent, or Firm* — Studebaker & Brackett PC (57) ABSTRACT A structure damage cause estimation system, a structure damage cause estimation method, and a structure damage cause estimation server that enable a damage cause to be estimated with a high probability are provided. A structure damage cause estimation system (100) includes a database (110) that has data of a captured image and a damage cause of a structure, an image acquisition unit (115) that acquires a captured image of a target structure to be inspected, a damage detection unit (125) that detects damage from the captured image, a similar damage extraction unit (130) that extracts similar damage similar to the damage by using the database (110), and a damage cause presentation unit (135) that presents damage causes of the similar damage. Also provided are a damage cause estimation method that uses the
(Continued)

structure damage cause estimation system (100), and a damage cause estimation server.

9 Claims, 6 Drawing Sheets

(51) Int. Cl.
| | |
|---|---|
| *G06F 16/58* | (2019.01) |
| *G06F 18/22* | (2023.01) |
| *G06T 3/4038* | (2024.01) |
| *G06T 7/00* | (2017.01) |
| *G06T 7/60* | (2017.01) |
| *G06T 7/73* | (2017.01) |
| *G06V 10/74* | (2022.01) |

(52) U.S. Cl.
CPC ............ *G06F 18/22* (2023.01); *G06T 3/4038* (2013.01); *G06T 7/0002* (2013.01); *G06T 7/60* (2013.01); *G06T 7/74* (2017.01); *G06V 10/761* (2022.01); *G06T 2207/20212* (2013.01); *G06T 2207/30184* (2013.01)

(58) Field of Classification Search
CPC . G06T 2207/20212; G06T 2207/30184; G06F 16/53; G06F 16/5866; G06F 18/22; G06V 10/761
See application file for complete search history.

(56) References Cited

U.S. PATENT DOCUMENTS

| | | | |
|---|---|---|---|
| 2001/0020194 A1* | 9/2001 | Takagi | G01N 21/94 700/32 |
| 2003/0161525 A1* | 8/2003 | Bruce | G03F 1/84 382/149 |
| 2004/0064269 A1* | 4/2004 | Shibuya | G06T 7/0004 702/40 |
| 2005/0226521 A1* | 10/2005 | LaChance | G06T 17/10 703/2 |
| 2007/0280526 A1* | 12/2007 | Malik | G06T 7/001 382/149 |
| 2007/0288219 A1* | 12/2007 | Zafar | G06T 7/0008 703/14 |
| 2012/0195490 A1* | 8/2012 | Langmans | G06T 7/0004 382/199 |
| 2016/0112602 A1* | 4/2016 | Kawai | H04N 1/00029 358/1.14 |
| 2016/0247429 A1* | 8/2016 | Li | G01J 5/0066 |
| 2018/0149603 A1* | 5/2018 | Bhattacharyya | G01R 31/311 |
| 2018/0180511 A1 | 6/2018 | Takamori et al. | |
| 2018/0182090 A1* | 6/2018 | Yamagishi | G06T 7/001 |
| 2018/0189749 A1 | 7/2018 | Takamori et al. | |
| 2018/0217024 A1 | 8/2018 | Takamori et al. | |
| 2018/0247416 A1 | 8/2018 | Ruda et al. | |
| 2018/0293255 A1* | 10/2018 | Karube | G06T 7/0002 |
| 2020/0003828 A1 | 1/2020 | Ambikapathi et al. | |
| 2020/0014816 A1 | 1/2020 | Speasl et al. | |
| 2020/0175352 A1 | 6/2020 | Cha et al. | |
| 2020/0184706 A1 | 6/2020 | Speasl et al. | |
| 2021/0272262 A1 | 9/2021 | Horita | |

FOREIGN PATENT DOCUMENTS

| | | |
|---|---|---|
| CN | 111027946 A | 4/2020 |
| EP | 3 349 173 A1 | 7/2018 |
| JP | H08-043316 A | 2/1996 |
| JP | 2000-018921 A | 1/2000 |
| JP | 2003-067519 A | 3/2003 |
| JP | 2006-146614 A | 6/2006 |
| JP | 2011-192270 A | 9/2011 |
| JP | 2012-225889 A | 11/2012 |
| JP | 2014085730 A | 5/2014 |
| JP | 2015-95143 A | 5/2015 |
| JP | 2016-065809 A | 4/2016 |
| JP | 2018-084130 A | 5/2018 |
| JP | 2018-181235 A | 11/2018 |
| JP | 2019-082933 A | 5/2019 |
| WO | 2017056804 A1 | 4/2017 |
| WO | 2020/110717 A1 | 6/2020 |

OTHER PUBLICATIONS

The extended European search report issued by the European Patent Office on Jan. 4, 2022, which corresponds to European Patent Application No. 19891104.2-1222 and is related to U.S. Appl. No. 17/319,187.

An Office Action mailed by the Japanese Patent Office on Oct. 7, 2022, which corresponds to Japanese Patent Application No. 2020-558314 and is related to U.S. Appl. No. 17/319,187; with English language translation.

International Search Report issued in PCT/JP2019/044449; mailed Jan. 21, 2020.

Written Opinion issued in PCT/JP2019/044449; mailed Jan. 21, 2020.

An Office Action; "Notice of Reasons for Refusal", mailed by the Japanese Patent Office on May 10, 2022, which corresponds to Japanese Patent Application No. 2020-558314 and is related to U.S. Appl. No. 17/319,187; with English language translation.

Communication pursuant to Article 94(3) EPC issued by the European Patent Office on Nov. 21, 2023, which corresponds to European Patent Application No. 19891104.2-1203 and is related to U.S. Appl. No. 17/319,187.

An Office Action mailed by The State Intellectual Property Office of People's Republic of China on Oct. 28, 2023, which corresponds to Chinese Patent Application No. 201980075325.7 and is related to U.S. Appl. No. 17/319,187; with English translation.

An Office Action mailed by China National Intellectual Property Administration on Feb. 1, 2024, which corresponds to Chinese Patent Application No. 201980075325.7 and is related to U.S. Appl. No. 17/319,187; with English language translation.

Gao Bo, "Design of High-speed Railway Tunnel", 1st edition, pp. 156-161, Dec. 31, 2010, China Railway Publishing House. Beijing.

An Office Action mailed by China National Intellectual Property Administration on Apr. 27, 2024, which corresponds to Chinese Patent Application No. 201980075325.7 and is related to U.S. Appl. No. 17/319,187; with English language translation.

International Search Report issued in PCT/JP2021/037302; mailed Dec. 21, 2021, which corresponds to U.S. Appl. No. 18/308,763 and is related to U.S. Appl. No. 17/319,187.

International Preliminary Report on Patentability (Chapter I) and Written Opinion of the International Searching Authority issued in PCT/JP2021/037302; issued May 16, 2023, which corresponds to U.S. Appl. No. 18/308,763 and is related to U.S. Appl. No. 17/319,187.

Extended European Search Report issued in EP 21 89 4359.5-1218 by the European Patent Office on Jun. 10, 2024, which corresponds to U.S. Appl. No. 18/308,763 and is related to U.S. Appl. No. 17/319,187.

An Office Action; "Notice of Reasons for Refusal", issued in JP 2022-563621; mailed by the Japanese Patent Office on Dec. 20, 2024, which corresponds to U.S. Appl. No. 18/308,763 and is related to U.S. Appl. No. 17/319,187.

An Office Action; "Decision of Refusal", issued in JP 2022-563621; mailed by the Japanese Patent Office on Mar. 7, 2025, which corresponds to U.S. Appl. No. 18/308,763 and is related to U.S. Appl. No. 17/319,187.

An Office Action; mailed by the United States Patent and Trademark Office on Jun. 11, 2025, which corresponds to U.S. Appl. No. 18/308,763 and is related to U.S. Appl. No. 17/319,187.

Summos to attend oral proceedings pursuant to Rule 115(1) EPC issued by the European Patent Office on Jun. 3, 2025, which corresponds to European Patent Application No. 19 891 104.2-1207 and is related to U.S. Appl. No. 17/319,187.

(56) References Cited

OTHER PUBLICATIONS

An Office Action mailed by the United States Patent and Trademark Office on Oct. 31, 2025, which corresponds to U.S. Appl. No. 18/308,763 and is related to U.S. Appl. No. 17/319,187.

* cited by examiner

STRUCTURE DAMAGE CAUSE ESTIMATION SYSTEM, STRUCTURE DAMAGE CAUSE ESTIMATION METHOD, AND STRUCTURE DAMAGE CAUSE ESTIMATION SERVER

CROSS-REFERENCE TO RELATED APPLICATIONS

This application is a Continuation of PCT International Application No. PCT/JP2019/044449 filed on Nov. 13, 2019, which claims priority under 35 U.S.C § 119(a) to Japanese Patent Application No. 2018-223786 filed on Nov. 29, 2018. Each of the above application(s) is hereby expressly incorporated by reference, in its entirety, into the present application.

BACKGROUND OF THE INVENTION

1. Field of the Invention

The present invention relates to a structure damage cause estimation system, a structure damage cause estimation method, and a structure damage cause estimation server. More particularly, the present invention relates to a damage cause estimation system, a damage cause estimation method, and a damage cause estimation server that estimate a damage cause by using a database including results about damage causes of structures inspected in the past.

2. Description of the Related Art

Social infrastructure such as a bridge needs to be periodically inspected. In a periodic inspection, a damage cause is estimated and identified from a result of a visual inspection, and diagnosis such as determination of a countermeasure class (determination of the necessity of repair) is made.

Since estimation and identification of a damage cause require advanced skills and experience, the results may vary among inspectors (diagnosis-making persons). Thus, there may be cases where estimation of the damage cause is difficult. Shortage of skilled inspectors is also a factor that hinders an appropriate damage cause from being estimated.

As a system for evaluating a defect of infrastructure including a structure such as a road, for example, JP2015-95143A describes a system for assisting evaluation of a defect of infrastructure. The system generates a recommendation ranking list of pieces of defect information having high degrees of similarity to defect information to be processed, on the basis of co-occurrence information which is a co-occurrence probability for defect information and of the defect information to be processed.

SUMMARY OF THE INVENTION

JP2015-95143A describes that the defect information may include a structure type name or, as other information, "a volume of traffic", "information on the structure", "construction year", etc. in addition to a damage item name such as a crack or a free lime. However, for example, the volume of traffic or the information on the structure is merely one condition used for identifying a damage cause. Thus, it is not possible to determine that deterioration is caused by fatigue because the volume of traffic is large. Accordingly, a system for simply obtaining a damage cause is desired.

The present invention is made in view of such a circumstance, and an object of the present invention is to provide a structure damage cause estimation system, a structure damage cause estimation method, and a structure damage cause estimation server that extract and list damage examples similar to a damage state of a structure subjected to a current inspection by using a database including damage causes identified in past inspections so as to enable estimation of a damage cause with a high probability.

To accomplish the object of the present invention, a structure damage cause estimation system according to an aspect of the present invention includes a database that has data of a captured image of damage of a structure before repair and a damage cause of the structure; an image acquisition unit that acquires a captured image of a target structure to be inspected; an actual size information acquisition unit that acquires an actual size of a characteristic portion of the target structure in the captured image or an actual length of the target structure; a damage detection unit that detects damage from the captured image acquired by the image acquisition unit, and calculates a degree of the damage, based on information acquired by the actual size information acquisition unit; a similar damage extraction unit that determines a degree of similarity of the damage detected by the damage detection unit to damage of the structure in the database, and extracts one or more kinds of similar damage for which the degree of similarity is high; and a damage cause presentation unit that presents damage causes of the kinds of similar damage extracted by the similar damage extraction unit.

To accomplish the object of the present invention, a structure damage cause estimation method according to an aspect of the present invention includes an image acquisition step of, with an image acquisition unit, acquiring a captured image of a target structure to be inspected; an actual size information acquisition step of, with an actual size information acquisition unit, acquiring an actual size of a characteristic portion of the target structure in the captured image or an actual length of the target structure; a damage detection step of, with a damage detection unit, detecting damage from the captured image acquired in the image acquisition step, and calculating a degree of the damage, based on information acquired in the actual size information acquisition step; a similar damage extraction step of, with a similar damage extraction unit, by using a database having data of a captured image of damage of a structure before the repair and a damage cause of the structure, determining a degree of similarity of the damage detected in the damage detection step to damage of the structure in the database, and extracting one or more kinds of similar damage for which the degree of similarity is high; and a damage cause presentation step of, with a damage cause presentation unit, presenting damage causes of the kinds of similar damage extracted in the similar damage extraction step.

To accomplish the object of the present invention, a structure damage cause estimation server according to an aspect of the present invention is a structure damage cause estimation server that is connected to a user terminal via a network and estimates a damage cause of a target structure to be inspected and that includes a database that has data of a captured image of damage of a structure before repair and a damage cause of the structure; an image acquisition unit that acquires a captured image of a target structure to be inspected; an actual size information acquisition unit that acquires an actual size of a characteristic portion of the target structure in the captured image or an actual length of the target structure; a damage detection unit that detects damage from the captured image acquired by the image acquisition unit, and calculates a degree of the damage, based on information acquired by the actual size information acquisition unit; a similar damage extraction unit that determines a degree of similarity of the damage detected by the damage detection unit to damage of the structure in the database, and extracts one or more kinds of similar damage for which the degree of similarity is high; a damage cause presentation unit that presents damage causes of the kinds of similar damage extracted by the similar damage extraction unit; and a communication unit having a reception unit that receives the captured image from the user terminal via the network, and a transmission unit that transmits the damage causes presented by the damage cause presentation unit to the user terminal.

The structure damage cause estimation system according to an aspect of the present invention is capable of extracting damage examples similar to a damage state of a target structure subjected to an inspection by using a database including damage causes identified in past inspections. By extracting damage having a high degree of similarity to the damage of the target subjected to the inspection from the database and listing damage causes, a user can refer to the result when identifying the damage cause. Thus, the accuracy of estimation of the damage cause can be increased.

DESCRIPTION OF THE PREFERRED EMBODIMENTS

A structure damage cause estimation system, a structure damage cause estimation method, and a structure damage cause estimation server according to one embodiment of the present invention will be described below with reference to the accompanying drawings.

Structure of Bridge

Figure 1:
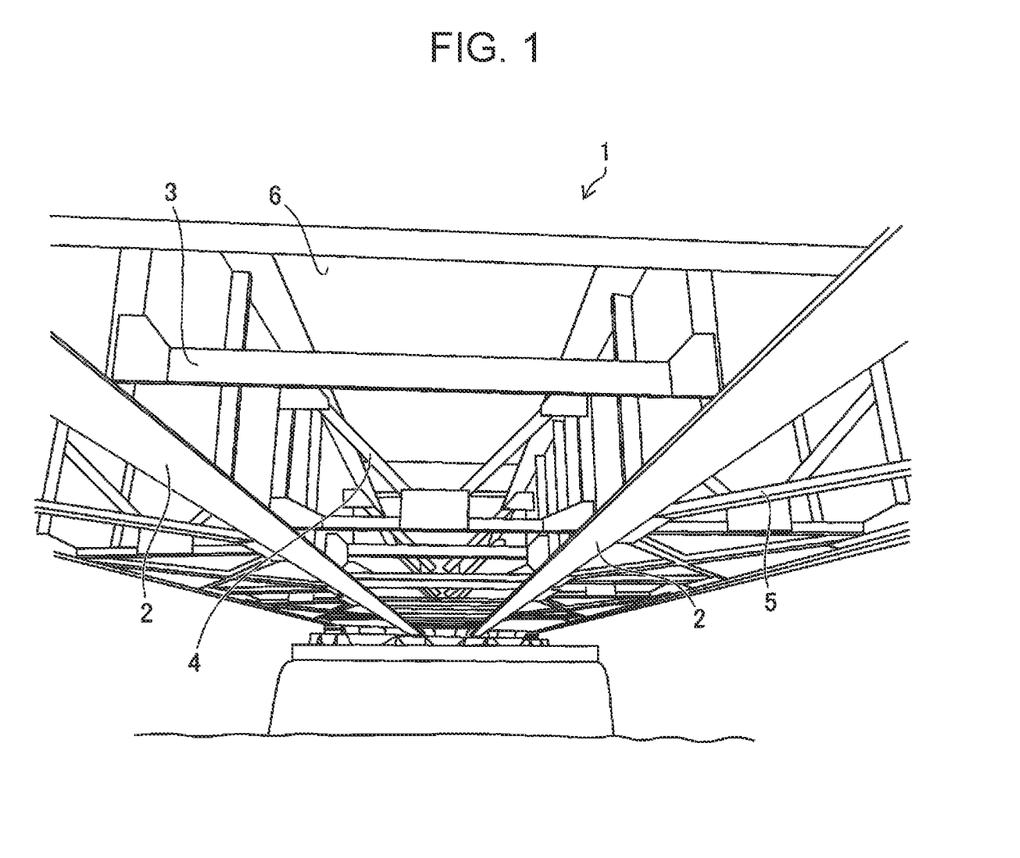
FIG. 1 is an external view of a bridge view from below.

FIG. 1 is a perspective view of a bridge 1, which is a structure, viewed from below. The bridge 1 illustrated in FIG. 1 has a three-dimensional structure constituted by main girders 2, cross beams 3, sway bracings 4, lateral bracing 5, and deck slabs 6. These members are connected to each other with bolts, rivets, welding, and so on. The deck slabs 6 on which vehicles or the like travel are placed above the main girders 2 and so on. As the deck slabs 6, reinforced concrete deck slabs are typically used. The main girders 2 are members laid between abutments or piers to support the load of vehicles or the like on the deck slabs 6. The main girders 2 have surfaces (vertical surfaces) orthogonal to surfaces (horizontal surfaces) of the deck slabs 6. The cross beams 3 are members that connect the plurality of main girders 2 to each other so that the main girders 2 support the load. The sway bracings 4 and the lateral bracings 5 are members that connect the main girders 2 to each other to resist the lateral load imposed by winds and earthquakes. In the present embodiment, the structure is not limited to a bridge, and may be a tunnel, a building, and a road or the like.

Structure Damage Cause Estimation System

Figure 2:
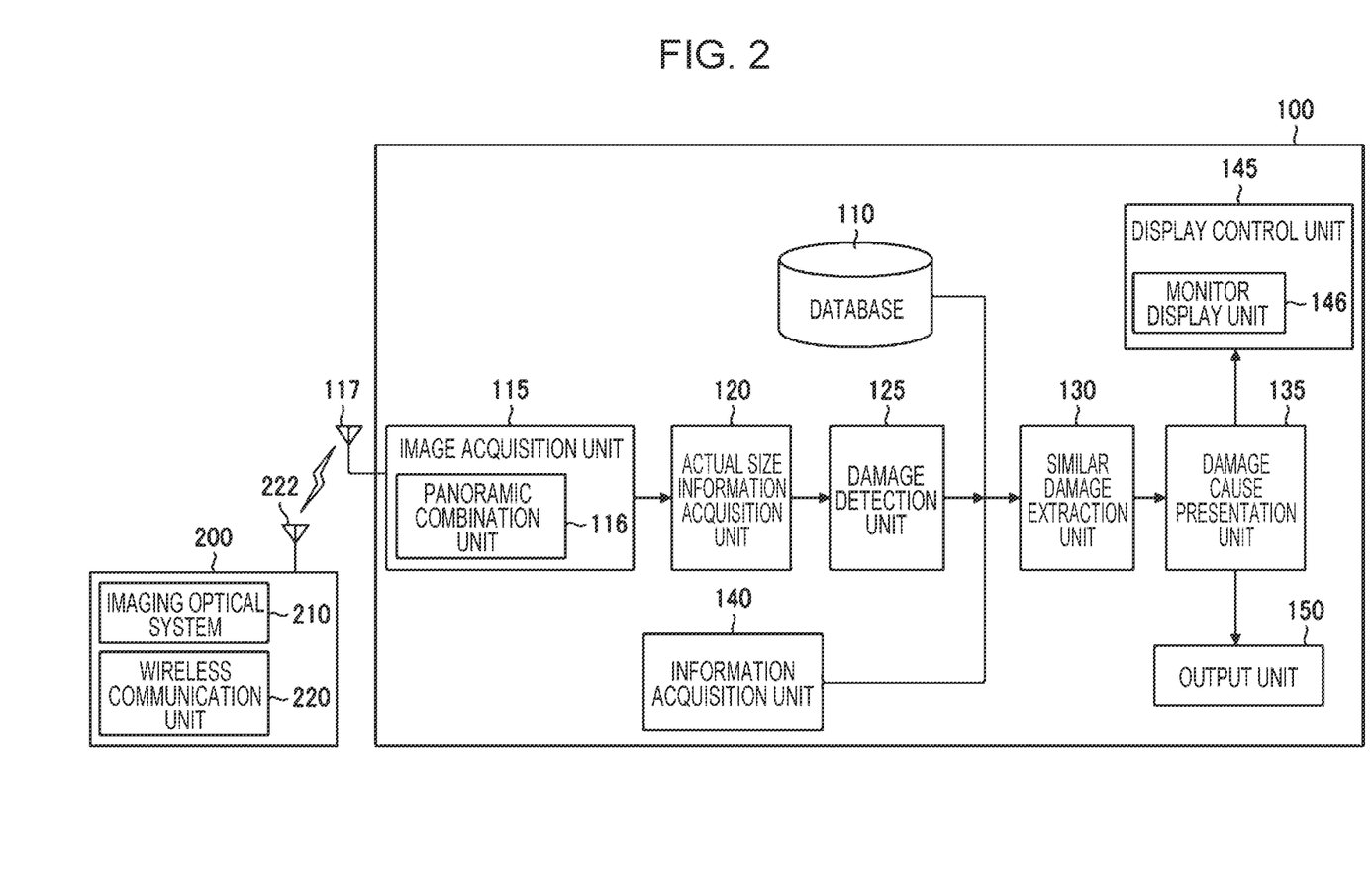
FIG. 2 is a block diagram illustrating a configuration of a structure damage cause estimation system.

FIG. 2 is a block diagram illustrating schematic configurations of a damage cause estimation system 100 according to one embodiment of the present invention and of a digital camera 200.

The damage cause estimation system 100 according to the present embodiment has a database 110, an image acquisition unit 115, an actual size information acquisition unit 120, a damage detection unit 125, a similar damage extraction unit 130, and a damage cause presentation unit 135. The damage cause estimation system 100 may include an information acquisition unit 140 that acquires information on a target structure to be inspected, namely, other information such as a damage cause and structure information held in association with the structure in the database 110, a display control unit 145 that displays estimated damage causes, and an output unit 150 that outputs the estimated damage causes.

The damage cause estimation system 100 is a system that detects damage from an image obtained by capturing an image of a target structure to be inspected and estimates a damage cause of the damage. The damage cause estimation system 100 is applicable to a digital camera, a smartphone, a tablet terminal, a personal computer, and the like. The image acquired by the image acquisition unit 115 can be captured by the digital camera 200. The digital camera 200 may be placed in a housing different from that of the damage cause estimation system 100, or may be integrated with the damage cause estimation system 100. The digital camera 200 may be incorporated as a portion of the damage cause estimation system 100 and may constitute the structure damage cause estimation system according to the present embodiment.

Configuration of Digital Camera

The digital camera 200 captures an image with an imaging optical system 210 including an imaging lens (not illustrated) and an imaging element (not illustrated). Examples of the imaging element include a charge coupled device (CCD) imaging element and a complementary metal-oxide semiconductor (CMOS) imaging element. Color filters of red (R), green (G), and blue (B) are disposed on a light-receiving surface of the imaging element. Thus, the imaging element is capable of acquiring a color image of a photographic subject on the basis of signals of the respective colors. The digital camera 200 wirelessly communicates with the damage cause estimation system 100 via a wireless communication unit 220 and an antenna 222, so that the captured image is input to the image acquisition unit 115 and is subjected to processing described below.

If an image of the entire structure or portion serving as a photographic subject cannot be captured in a single image-capturing operation performed with the digital camera 200, a group of images is acquired by capturing images of segments of the structure or portion serving as the photographic subject. The image acquisition unit 115 includes a panoramic combination unit 116 and may use an image resulting from panoramic combination processing performed on the group of images by the panoramic combination unit 116. The digital camera 200 may be, for example, a general-purpose compact digital camera having the number of pixels of about 5000×4000 pixels.

Each Constituent of Structure Damage Cause Estimation System

The damage cause estimation system 100 is constituted mainly by the database 110, the image acquisition unit 115, the actual size information acquisition unit 120, the damage detection unit 125, the similar damage extraction unit 130, and the damage cause presentation unit 135. These are connected to each other to transmit and receive necessary information. The damage cause estimation system 100 wirelessly communicates with the digital camera 200 via an antenna 117, and acquires a captured image captured by the digital camera 200.

Database

The database 110 is a recording means for storing a captured image of a structure before repair and a damage cause of the structure.

As damage causes of a concrete member, example of the damage cause include (1) deterioration due to fatigue (repeatedly imposed load), salt, neutralization, alkali-silica reaction, frost damage, chemical erosion, and so on; (2) construction-relating factors such as heat of hydration and drying shrinkage caused during construction; and (3) structural factors such as application of an excessive external force and an inappropriate design. As damage causes of a steel member, examples of the damage cause include (1) deterioration due to fatigue (repeatedly imposed load), salt, and so on; and (2) structural factors such as application of an excessive external force and an inappropriate design.

The information stored in the database 110 can include damage information of the structure. The damage information of the structure can include a type of damage, a position of the damage, and a degree of the damage (such as a length, a width, an area, a density, a depth, or the like, or an average value or maximum value thereof).

The information stored in the database 110 may include, as other information, structure information, environment information, and history information. Examples of the structure information include (1) a type of the structure which is, for example, a girder bridge, a rigid-frame bridge, a truss bridge, an arch bridge, a cable-stayed bridge, a suspension bridge, or the like in the case of a bridge; (2) a type of a member which is, for example, a deck slab, a pier, an abutment, a girder, or the like in the case of a bridge; and (3) a material, which is, for example, steel, reinforced concrete, prestressed concrete (PC), or the like.

Examples of the environment information include a daily, monthly, yearly, or cumulative volume of traffic, a distance from the sea, and climates such as an average temperature, an average humidity, a rainfall, and a snowfall.

Examples of the history information include construction conditions such as temperatures during construction; the number of elapsed years; a repair history; a disaster history of earthquakes, typhoons, floods, and so on; and monitoring information on deflection, a vibration amplitude, a vibration period, and so on.

The database 110 may further store at least one of captured images or damage information of damage of a structure at a plurality of past time points. By storing the past captured images and the damage information, a chronological change of the target structure can also be used in determination of the degree of similarity when the degree of similarity is determined.

Image Acquisition Unit

The image acquisition unit 115 acquires a captured image of a target structure to be inspected. As the captured image, an image is acquired in units of structures or in units of members of the target structure.

The image acquisition unit 115 acquires a captured image of the bridge 1 from the digital camera 200 (or a recording medium, a network, or the like). The captured image may be an image obtained by capturing the entire structure in a single image-capturing operation, or may be a plurality of images obtained by capturing images of segments of the target structure as a group of images when a region for which the captured image is to be acquired cannot be covered by a single image-capturing operation with a predetermined resolution. When a plurality of images are acquired, the panoramic combination unit 116 performs panoramic combination processing. In the panoramic combination processing, correspondence points between images are detected, and the captured images are combined together on the basis of the correspondence points between the images.

The image acquisition unit 115 may periodically acquire the captured image of the target structure to acquire chronological images of the target structure. When detecting similar damage, the similar damage extraction unit 130 described later can also use a chronological change in the target structure to determine the degree of similarity. Note that it is sufficient that at least an image at the previous inspection and an image at the current inspection are acquired as the chronological images.

Actual Size Information Acquisition Unit

The actual size information acquisition unit 120 acquires an actual size of a characteristic portion of the target structure in the captured image acquired by the image acquisition unit 115 or an actual length of the target structure. In a method for obtaining an actual length of a structure, the actual length of the target structure can be obtained by acquiring a resolution representing an actual length of the target structure per unit pixel of the captured image. In another method, the actual length of the target structure can be obtained by capturing an image of the structure together with an object with which the length of the structure is obtained, or by capturing an image by projecting a scale.

Damage Detection Unit

The damage detection unit 125 detects damage from the captured image acquired by the image acquisition unit 115. The damage detection unit 125 also calculates a degree of the damage on the basis of information acquired by the actual size information acquisition unit 120.

In the case where the structure is a concrete member, the damage detection unit 125 detects, as damage to be detected, damage such as a crack, water leakage, free lime, peeling, exposure of a reinforcement steel, and delamination. In the case where the structure is a steel member, the damage detection unit 125 detects damage such as fracture, corrosion, and deterioration of anti-corrosion function. The damage detection unit 125 detects any one or more of these kinds of damage.

The detection can be performed through detection using a machine-learning-based detector and a detection algorithm.

For example, items to be measured for detecting a crack include a position, a size, a direction, a range, a shape, and the like. These items can be set according to conditions such as a type and characteristics of the structure. A crack can be detected by using various methods. For example, a crack detection method described in JP4006007B can be used. This method is a crack detection method having a step of creating a wavelet image and a step of determining a crack region on the basis of the wavelet image. In the step of creating a wavelet image, a wavelet coefficient corresponding to two densities to be compared is calculated, wavelet coefficients in the cases where the two densities are each changed are calculated to create a wavelet coefficient table, and wavelet transform is performed on an input image obtained by capturing an image of a concrete surface subjected to crack detection. In the step of determining a crack region, a wavelet coefficient corresponding to an average density of neighboring pixels in a local region and to a density of a pixel of interest in the wavelet coefficient table is set as a threshold value, and a crack region and a non-crack region are determined by comparing the wavelet coefficient of the pixel of interest with the threshold value.

Similar Damage Extraction Unit

The similar damage extraction unit 130 determines a degree of similarity on the basis of the type of the damage, the position of the damage, and the degree of the damage, and extracts one or more kinds of similar damage having high degrees of similarity from the database 110.

The similar damage extraction unit 130 may determine the degree of similarity on the basis of chronological changes in the position of the damage and the degree of damage in addition to the damage information. The similar damage extraction unit 130 may determine the degree of similarity on the basis of any one or more of the structure information, the environment information, the history information, the disaster information, and the inspection information in the database 110, and extract similar damage.

In determination of the degree of similarity, a distance between damage of an inspection-target structure and damage of another structure stored in the database is calculated in a feature space having the above information as feature vectors. Damage having this distance equal to or less than a certain threshold value is extracted as similar damage.

Figure 3:
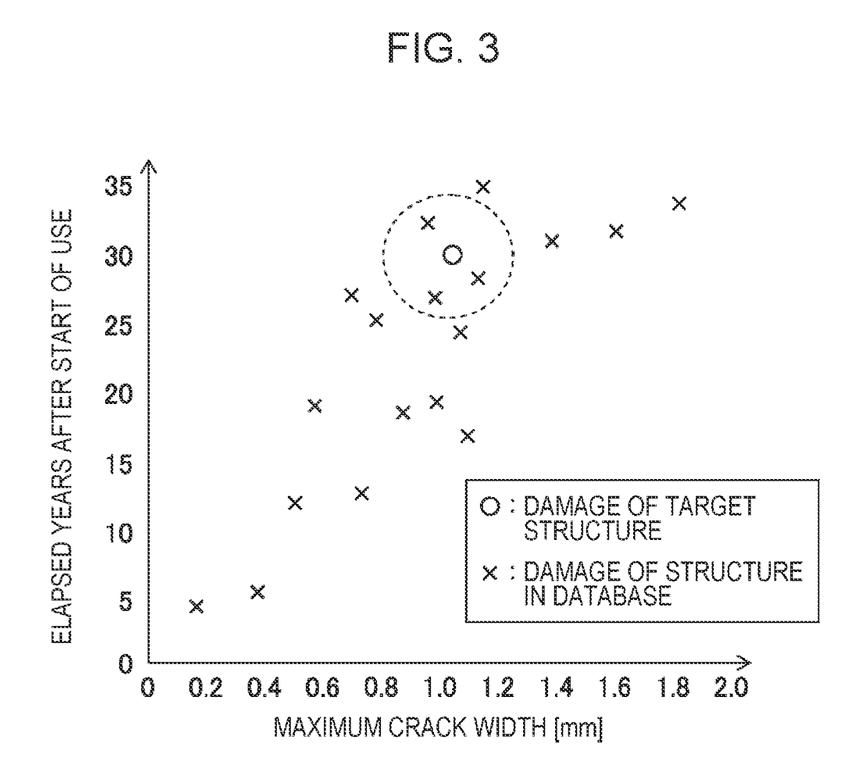
FIG. 3 is a graph illustrating a concept of determining a degree of similarity of damage.

FIG. 3 is a graph illustrating a concept of determining a degree of similarity. The feature space defined by feature vectors can be a multi-dimensional space defined by parameters selected from the group consisting of the type of the damage, the position of the damage, the degree of the damage, chronological changes in the position of the damage and the degree of damage, the structure information, the environment information, the history information, the disaster information, and the inspection information which are used when the degree of similarity is determined. Note that FIG. 3 illustrates a two-dimensional space to simplify the description.

In FIG. 3, the maximum crack width is plotted as a first feature vector on a lateral axis, and the number of elapsed years after the start of use is plotted as a second feature vector on a vertical axis. A predetermined distance from damage of the target structure to be inspected is set as a threshold value, and damage having a distance less than or equal to this threshold value is extracted as similar damage. In FIG. 3, a circle centered at the target structure and represented by a broken line indicates that the distance is less than or equal to the threshold value.

When similar damage is extracted, a distance (Euclidean distance) based on parameters that are not weighted may be used, or a distance (Mahalanobis distance) based on weighted parameters may be used. How which parameter is weighted may be determined by a statistical method such as principal component analysis.

Damage Cause Presentation Unit

Figure 4:
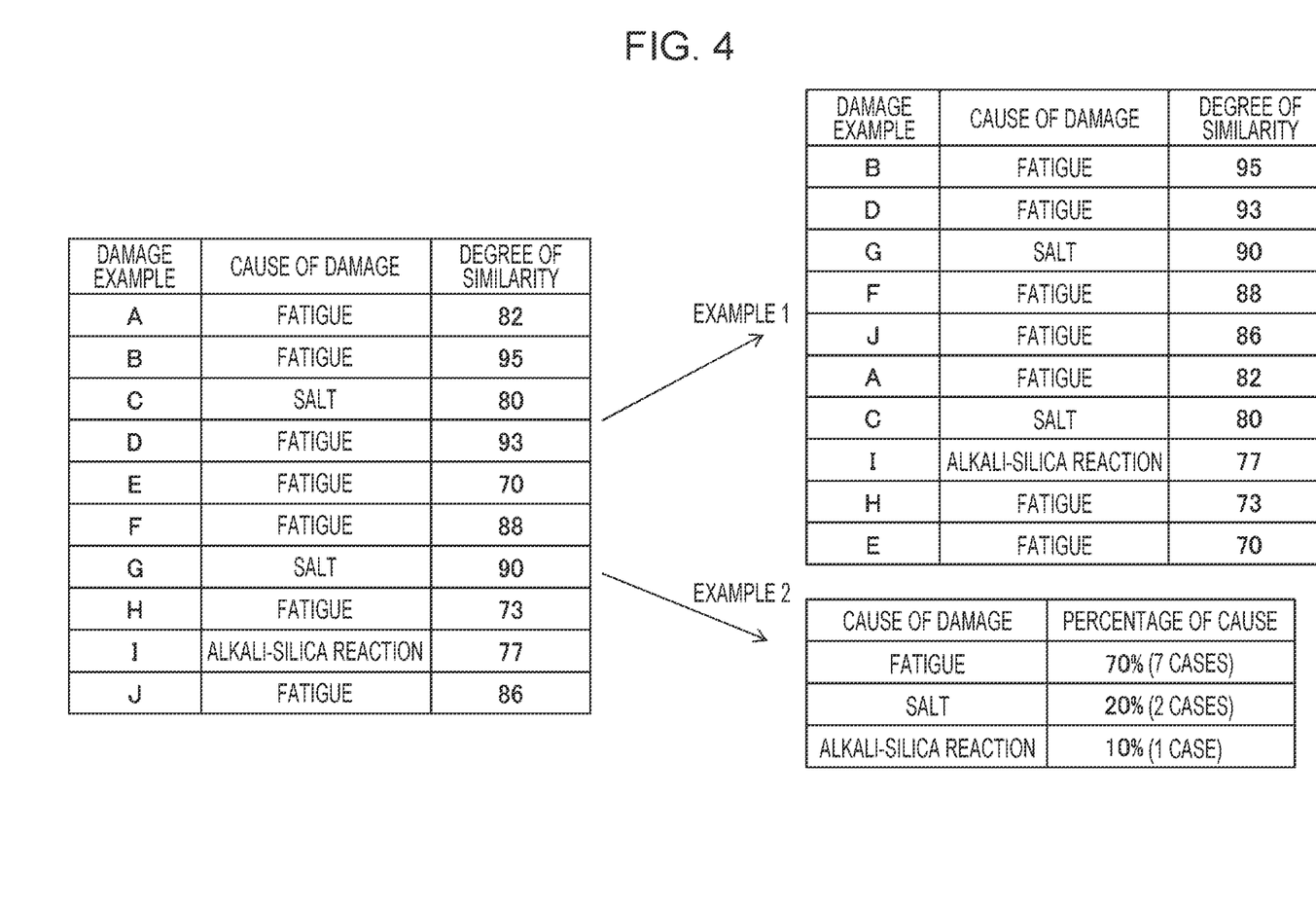
FIG. 4 is a diagram describing a method of presenting damage causes.

The damage cause presentation unit 135 presents damage causes of similar damage extracted by the similar damage extraction unit 130. As for a method for presenting the damage causes, for example, the damage causes can be presented in the following manner. FIG. 4 is a diagram describing a method of presenting damage causes.

(1) Pieces of Information on Similar Damage are Presented in Descending Order of the Degree of Similarity.

Among kinds of similar damage extracted by the similar damage extraction unit 130, pieces of information on kinds of similar damage having high degrees of similarity, for example, pieces of information on kinds of similar damage having the top 100 degrees of similarity are listed in descending order of the evaluation score (EXAMPLE 1).

(2) Percentages of Damage Causes of Similar Damage are Presented.

Occurrence frequencies (percentages) of damage causes of kinds of similar damage having high degrees of similarity, for example, kinds of similar damage having the top 100 degrees of similarity among the kinds of similar damage extracted by the similar damage extraction unit 130 are calculated and presented along with the respective damage causes. For example, in EXAMPLE 2 of FIG. 4, among 10 kinds of similar damage (A to J), the damage cause is fatigue in seven cases, the damage cause is salt in two cases, and the damage cause is alkali-silica reaction in one case. Thus, the damage causes are represented as fatigue (70%), salt (20%), and alkali-silica reaction (10%).

(3) Damage Causes in the Database are Listed for the Extracted Similar Damage.

Damage causes may be listed for the similar damage extracted by the similar damage extraction unit 130 without rearranging the order.

FIG. 4 illustrates the 10 damage examples A to J as examples of damage to simplify the illustration. However, in practice, it is preferable to extract 100 damage examples up to the 100th place as described above and present the damage causes.

The information to be presented is not the damage causes alone, and information such as the captured image and the damage information (the type of damage, the position of damage, the degree of the damage (such as length, width, or area) of the target structure can be presented.

In one embodiment of the present invention, the damage causes to be presented are causes of damage that can be fixed by repair. For example, in the case of examples of the damage cause of a concrete member, deteriorations include fatigue, salt damage, neutralization, alkali-silica reaction, frost damage, chemical erosion, and so on. Construction-relating factors include heat of hydration, drying shrinkage, and so on caused during construction. Structural factors include application of an excessive external force, an inappropriate design, and so on. In the case of examples of the damage cause of a steel member, deteriorations include fatigue, salt damage, and so on. Structural factors include application of an excessive external force and an inappropriate design.

Information Acquisition Unit

The information acquisition unit 140 acquires structure information, environment information, and history information (hereinafter, also referred to as "information on the structure or the like") of the target structure to be inspected. As the structure information, the environment information, and the history information, information substantially the same as the information included in the database 110 described above is acquired.

When the information acquisition unit 140 acquires the information, the information can be input using an operation section (not illustrated). The operation section includes a keyboard and a mouse as input devices. When a monitor display unit 146 described later has a touch panel, the operation section also includes the touch panel. The user can input information on the structure or the like through these devices and the screen of the monitor display unit 146. The information acquisition unit 140 acquires the input information on the structure or the like.

Display Control Unit

The display control unit 145 includes the monitor display unit 146, and causes the monitor display unit 146 to display information such as the acquired captured image, the damage causes of the extracted similar damage, and the information on the target structure to be inspected. The display control unit 145 controls the matters relating to the display screen such as information to be displayed on the monitor display unit 146. The monitor display unit 146 is a display device such as a liquid crystal display.

Output Unit

The output unit 150 outputs the damage causes presented by the damage cause presentation unit 135 as text data or table data. The output unit 150 also outputs the acquired captured image. These pieces of information may be output as data of a figure.

Procedure of Damage Cause Estimation Method

Figure 5:
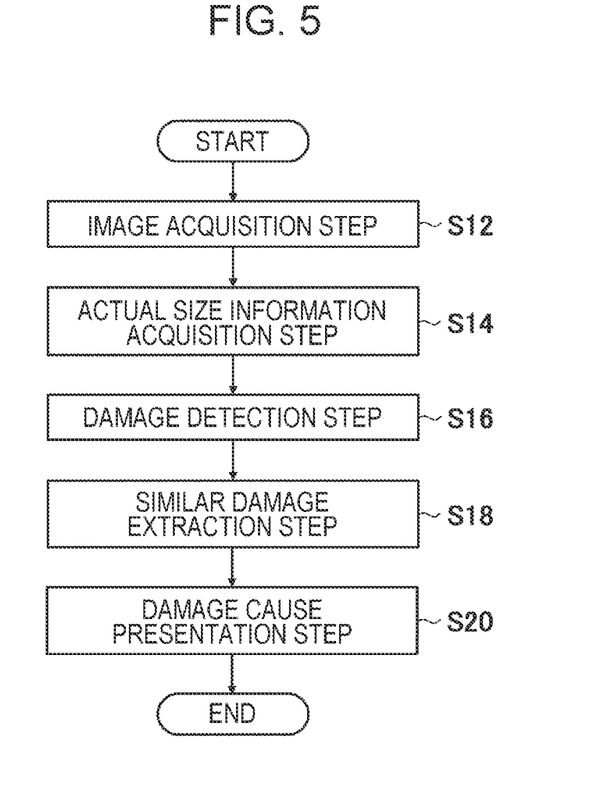
FIG. 5 is a flowchart of a structure damage cause estimation method.

A damage cause estimation method used by the damage cause estimation system will be described. FIG. 5 is a flowchart illustrating a procedure of the damage cause estimation method.

Image Acquisition Step

An image acquisition step is a step of acquiring a captured image of a target structure to be inspected (step S12). The captured image is obtained by the digital camera 200. The damage cause estimation system 100 acquires a captured image via the digital camera 200 (the imaging optical system 210, the wireless communication unit 220, and the antenna 222), the antenna 117, and the image acquisition unit 115.

In a case where the captured image is a plurality of captured images (a group of image images), panoramic combining processing for combining the plurality of captured images into a single image is performed. In combination of the captured images, calculation of combination information, for example, calculation of correspondence points between the captured images and calculation of a projective transformation matrix on the basis of the correspondence points, is performed, and the images are combined on the basis of the correspondence points.

Actual Size Information Acquisition Step

In an actual size information acquisition step, an actual size of a characteristic portion of the target structure in the captured image acquired in the image acquisition step or an actual length of the target structure is acquired (step S14).

Damage Detection Step

A damage detection step is a step of detecting damage from the captured image acquired in the image acquisition step (step S16). A degree of the damage is also calculated on the basis of the information acquired in the actual size information acquisition step.

Similar Damage Extraction Step

In a similar damage extraction step, degrees of similarity of the damage detected in the damage detection step to kinds of damage of structures in the database 110 are determined using the database 110, and one or more kinds of similar damage having high degrees of similarity are extracted (step S18).

As for the extraction of similar damage, the structure may be periodically inspected after the repair. This inspection history may be recorded in the database 110. The degree of similarity may be determined on the basis of the chronological change based on this inspection record.

Damage Cause Presentation Step

In a damage cause presentation step, damage causes of the kinds of similar damage extracted in the similar damage extraction step are presented (step S20). In presentation of the damage causes, the damage causes can be presented so that the damage cause is easily determined, by using a method of presenting damage causes in descending order of the degree of similarity for the respective kinds of similar damage or of presenting a percentage of each damage cause with respect to the extracted kinds of similar damage together with the damage cause.

Structure Damage Cause Estimation Server

Figure 6:
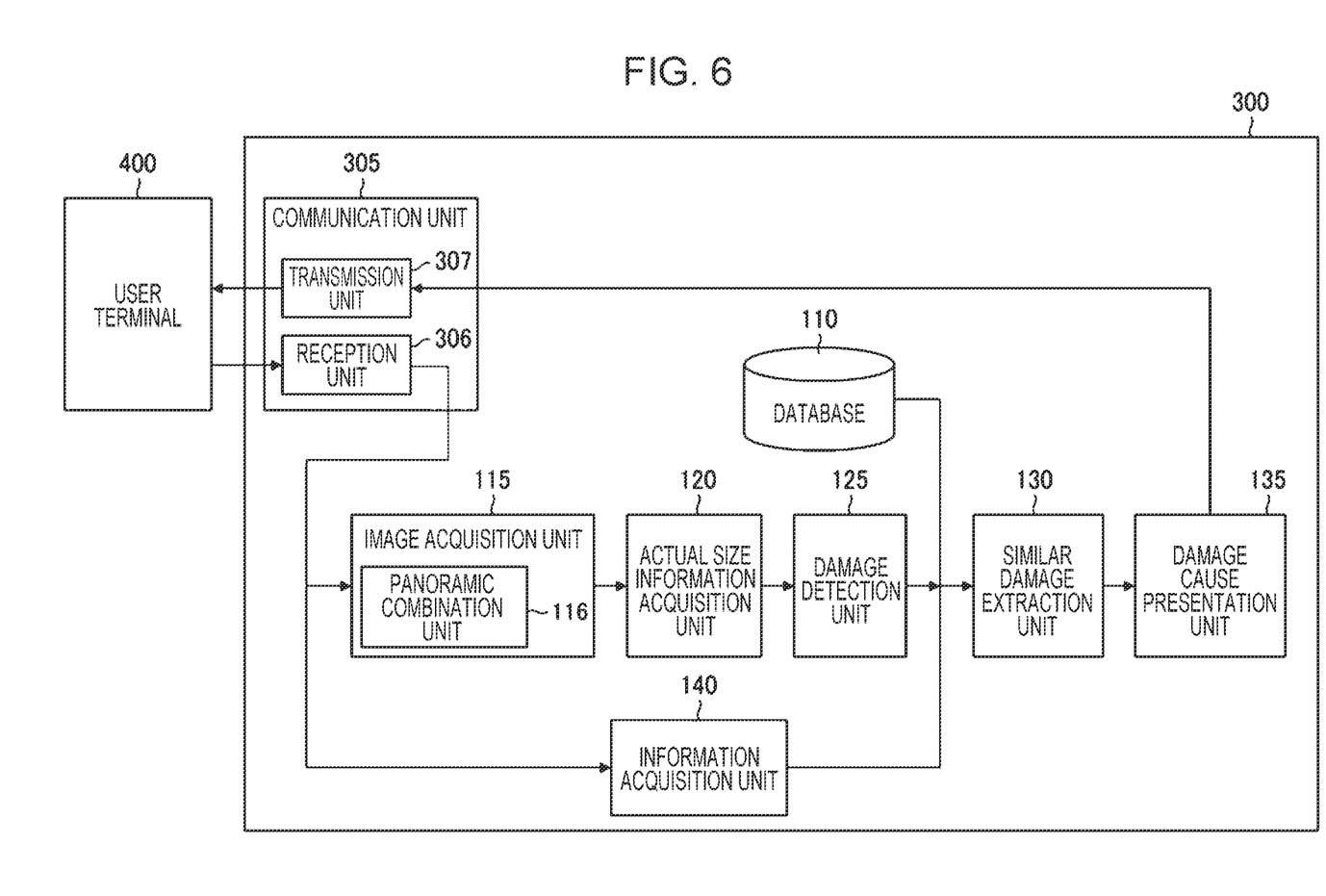
FIG. 6 is a block diagram illustrating a configuration of a structure damage cause estimation server.

FIG. 6 is a block diagram illustrating a schematic configuration of a damage cause estimation server 300 according to one embodiment of the present invention. The same components as those of the damage cause estimation system 100 illustrated in FIG. 2 are denoted by the same reference signs, and description thereof will be omitted below.

The damage cause estimation server 300 according to the present embodiment has the database 110, the image acquisition unit 115, the actual size information acquisition unit 120, the damage detection unit 125, the similar damage extraction unit 130, the damage cause presentation unit 135, and a communication unit 305. The damage cause estimation server 300 may also include the information acquisition unit 140 that acquires information on a target structure to be inspected, namely, other information such as structure information of the structure held in the database 110.

The damage cause estimation server 300 includes the communication unit 305 and is connected to a user terminal 400 via a network. The communication unit 305 includes a reception unit 306 and a transmission unit 307. The reception unit 306 receives a captured image of a target structure to be inspected from the user terminal 400. The received captured image is transmitted to the image acquisition unit 115 and is processed in substantially the same manner as in the damage cause estimation system 100 illustrated in FIG. 2. The damage cause presentation unit 135 presents damage causes of the target structure to be inspected. The reception unit 306 may also receive information on the structure or the like input to the user terminal 400 and transmit the information to the information acquisition unit 140. The information may be used by the similar damage extraction unit 130 to determine the degree of similarity.

The damage causes presented by the damage cause presentation unit 135 are transmitted to the communication unit 305. The transmission unit 307 transmits the presented damage causes to the user terminal 400. A user checks the presented damage causes on the user terminal 400. In this manner, the accuracy of determining the damage cause can be increased.

As described above, the structure damage cause estimation system, the structure damage cause estimation method, and the structure damage cause estimation server according to the present embodiments enable a user to determine a damage cause with a high accuracy by extracting kinds of similar damage from the database 110 and presenting damage causes of the extracted kinds of similar damage.

In each of the embodiments described above, the hardware structure of the processing units that perform various processes, such as the database 110, the image acquisition unit 115, the panoramic combination unit 116, the actual size information acquisition unit 120, the damage detection unit 125, the similar damage extraction unit 130, the damage cause presentation unit 135, the information acquisition unit 140, the display control unit 145, the output unit 150, the communication unit 305, the reception unit 306, and the transmission unit 307 is various processors as follows. The various processors include, for example, a central processing unit (CPU) which is a general-purpose processor that executes software (program) to function as the various processing units; a programmable logic device (PLD) which is a processor whose circuit configuration is changeable after manufacture, such as a field programmable gate array (FPGA); and a dedicated electric circuitry which is a processor having a circuit configuration designed exclusively for executing a specific process, such as an application-specific integrated circuit (ASIC).

A single processing unit may be implemented by one of these various processors, or may be implemented by two or more processors of the same kind or of different kinds (for example, a plurality of FPGAs or a combination of a CPU and an FPGA). In addition, the plurality of processing units may be implemented by a single processor. Examples in which the plurality of processing units are implemented by a single processor include a first configuration, as exemplified by a computer such as a client or a server, in which a combination of one or more CPUs and software constitutes a single processor and this processor functions as the plurality of processing units. The examples also include a second configuration, as exemplified by a system on chip (SoC) or the like, in which a processor that implements the functions of the entire system including the plurality of processing units with a single integrated circuit (IC) chip is used. As described above, the various processing units are implemented using one or more of the various processors described above in terms of the hardware structure.

Further, the hardware structure of these various processors is, more specifically, electric circuitry in which circuit elements such as semiconductor elements are combined.

The description above can be grasped as a structure damage cause estimation system described in Appendix 1 below.

APPENDIX 1

A structure damage cause estimation system including:
a memory that stores data of a captured image of damage of a structure before repair and a damage cause of the structure; and
a processor, wherein
the processor
acquires a captured image of a target structure to be inspected;
acquires an actual size of a characteristic portion of the target structure in the captured image or an actual length of the target structure;
detects damage from the captured image acquired, and calculates a degree of the damage, based on information acquired;
determines a degree of similarity of the detected damage to damage of the structure stored in the memory, and extracts one or more kinds of similar damage for which the degree of similarity is high; and
presents damage causes of the extracted kinds of similar damage.

REFERENCE SIGNS LIST 1 bridge
2 main girder
3 cross beam
4 sway bracing
5 lateral bracing
6 deck slab
100 damage cause estimation system
110 database
115 image acquisition unit
116 panoramic combination unit
117, 222 antenna
120 actual size information acquisition unit
125 damage detection unit
130 similar damage extraction unit
135 damage cause presentation unit
140 information acquisition unit
145 display control unit
146 monitor display unit
150 output unit
200 digital camera
210 imaging optical system
220 wireless communication unit
300 damage cause estimation server
305 communication unit
306 reception unit
307 transmission unit
400 user terminal

What is claimed is:

1. A structure damage cause estimation system comprising:
a memory configured to store data of a captured image of damage of a structure before repair, a damage cause of the structure, damage information of the structure including a type of the damage, a position of the damage and a degree of the damage, and at least one of structure information, environment information and history information of the structure; and
at least one processor configured to:
acquire a captured image of a target structure to be inspected;
acquire actual size information including an actual size of a characteristic portion of the target structure in the captured image or an actual length of the target structure;
detect damage from the captured image and calculate a degree of the damage, based on the actual size information;
determine a degree of similarity of the damage to damage of the structure in the memory, and extract one or more kinds of similar damage for which the degree of similarity is high; and
present damage causes of the kinds of similar damage, wherein
the at least one processor is further configured to:
determine the degree of similarity, based on a feature space having information as feature vectors, the feature space being a multi-dimensional space defined by parameters selected from the information;
set a predetermined distance from damage of the target structure as a predetermined threshold value;
calculate a distance in the multi-dimensional space of the parameters between damage of the target structure and damage of another structure stored in the memory; and
extract damage having the calculated distance equal to or less than the predetermined threshold value, as similar damage,
the memory is configured to store at least one of captured images or pieces of damage information of the damage of the structure at a plurality of past time points,
the at least one processor is configured to acquire chronological images of the target structure, and
the at least one processor is configured to use a chronological change in a position of the damage or the degree of the damage obtained from the captured images or the pieces of damage information of the damage of the structure at the plurality of past time points to determine the degree of similarity.

2. The structure damage cause estimation system according to claim 1, wherein the at least one processor is configured to present the damage causes of the kinds of similar damage and pieces of information on the kinds of similar damage in descending order of the degree of similarity.

3. The structure damage cause estimation system according to claim 1, wherein the at least one processor is configured to calculate occurrence frequencies of the respective damage causes of the kinds of similar damage and present the damage causes and the occurrence frequencies.

4. The structure damage cause estimation system according to claim 2, wherein the at least one processor is configured to calculate occurrence frequencies of the respective damage causes of the kinds of similar damage and present the damage causes and the occurrence frequencies.

5. The structure damage cause estimation system according to claim 1, wherein the at least one processor is configured to:
acquire a group of images obtained by capturing images of segments of the target structure, and
perform panoramic combination processing on the group of images.

6. The structure damage cause estimation system according to claim 1, wherein
the memory is configured to store at least one of captured images or pieces of damage information of the damage of the structure at a plurality of past time points,
the at least one processor is configured to acquire chronological images of the target structure, and
the at least one processor is configured to use a chronological change in a position of the damage or the degree of the damage obtained from the captured images or the pieces of damage information of the damage of the structure at the plurality of past time points to determine the degree of similarity.

7. The structure damage cause estimation system according to claim 1, wherein the at least one processor is configured to weight each piece of information.

8. A structure damage cause estimation method comprising:
an image acquisition step of, with an image acquisition unit, acquiring a captured image of a target structure to be inspected;
an actual size information acquisition step of, with an actual size information acquisition unit, acquiring an actual size of a characteristic portion of the target structure in the captured image or an actual length of the target structure;
a damage detection step of, with a damage detection unit, detecting damage from the captured image acquired in the image acquisition step, and calculating a degree of the damage, based on information acquired in the actual size information acquisition step;
a similar damage extraction step of, with a similar damage extraction unit, by using a database having data of a captured image of damage of a structure before the repair, a damage cause of the structure, damage information of the structure including a type of the damage, a position of the damage and a degree of the damage, and at least one of structure information, environment information and history information of the structure, determining a degree of similarity of the damage detected in the damage detection step to damage of the structure in the database, and extracting one or more kinds of similar damage for which the degree of similarity is high; and
a damage cause presentation step of, with a damage cause presentation unit, presenting damage causes of the kinds of similar damage extracted in the similar damage extraction step,
wherein the method further comprises:
determining the degree of similarity, based on a feature space having information as feature vectors, the feature space being a multi-dimensional space defined by parameters selected from the information;
setting a predetermined distance from damage of the target structure as a predetermined threshold value;
calculating a distance in the multi-dimensional space of the parameters between damage of the target structure and damage of another structure stored in the database; and
extracting damage having the calculated distance equal to or less than the predetermined threshold value, as similar damage, and
wherein the method further comprises:
storing at least one of captured images or pieces of damage information of the damage of the structure at a plurality of past time points,
acquiring chronological images of the target structure, and
using a chronological change in a position of the damage or the degree of the damage obtained from the captured images or the pieces of damage information of the damage of the structure at the plurality of past time points to determine the degree of similarity.

9. A structure damage cause estimation server that is connected to a user terminal via a network and estimates a damage cause of a target structure to be inspected, the structure damage cause estimation server comprising:
a memory configured to store data of a captured image of damage of a structure before repair, a damage cause of the structure, damage information of the structure including a type of the damage, a position of the damage and a degree of the damage, and at least one of structure information, environment information and history information of the structure; and
at least one processor configured to:
acquire a captured image of a target structure to be inspected;
acquire actual size information including an actual size of a characteristic portion of the target structure in the captured image or an actual length of the target structure;
detect damage from the captured image, and calculate a degree of the damage, based on the actual size information;
determine a degree of similarity of the damage to damage of the structure in the memory, and extract one or more kinds of similar damage for which the degree of similarity is high;
present damage causes of the kinds of similar damage; and
receive the captured image from the user terminal via the network, and transmit the damage causes to the user terminal, wherein
the at least one processor is further configured to:
determine the degree of similarity, based on a feature space having information as feature vectors, the feature space being a multi-dimensional space defined by parameters selected from the information;
set a predetermined distance from damage of the target structure as a predetermined threshold value;
calculate a distance in the multi-dimensional space of the parameters between damage of the target structure and damage of another structure stored in the memory; and
extract damage having the calculated distance equal to or less than the predetermined threshold value, as similar damage,
the memory is configured to store at least one of captured images or pieces of damage information of the damage of the structure at a plurality of past time points,
the at least one processor is configured to acquire chronological images of the target structure, and
the at least one processor is configured to use a chronological change in a position of the damage or the degree of the damage obtained from the captured images or the pieces of damage information of the damage of the structure at the plurality of past time points to determine the degree of similarity.

* * * * *